United States Patent
Davis et al.

(10) Patent No.: US 8,128,158 B1
(45) Date of Patent: Mar. 6, 2012

(54) METHOD AND DEVICE FOR ATTENUATING AERODYNAMICALLY INDUCED NOISES CAUSED BY VEHICLE GRILLE

(75) Inventors: Kwi C. Davis, Marysville, OH (US); Aaron R. Kerestan, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/871,260

(22) Filed: Aug. 30, 2010

(51) Int. Cl.
*B62D 25/08* (2006.01)
*B60R 19/52* (2006.01)

(52) U.S. Cl. .......... 296/193.1; 293/115; 296/180.1; 181/224

(58) Field of Classification Search .......... 296/193.1, 296/180.1; 293/115; 181/224, 229
See application file for complete search history.

(56) References Cited

U.S. PATENT DOCUMENTS

| | | | |
|---|---|---|---|
| 3,827,530 A * | 8/1974 | Heath | 181/207 |
| 6,405,819 B1 | 6/2002 | Ohkura et al. | |
| 6,470,700 B1 * | 10/2002 | Qiu et al. | 62/296 |
| 6,880,655 B2 | 4/2005 | Suwa et al. | |
| 6,918,456 B2 | 7/2005 | Dennison et al. | |
| 6,957,837 B2 | 10/2005 | Stull | |
| D593,460 S * | 6/2009 | Schiavone et al. | D12/163 |
| D605,988 S * | 12/2009 | Bennett et al. | D12/163 |
| 2008/0157566 A1 | 7/2008 | Tazaki et al. | |

* cited by examiner

*Primary Examiner* — Dennis Pedder
(74) *Attorney, Agent, or Firm* — Rankin Hill & Clark LLP (57) ABSTRACT

A bumper for a front end of a vehicle includes a body having an opening defining an air flow inlet. The opening is elongated in the transverse direction of the body and is defined by spaced apart transverse walls and spaced apart side walls. A grille is disposed in the opening. The grille includes at least one generally horizontal member having at least one sound attenuating member attached thereto and configured to at least partially alter the air flow passing through the grille to mitigate resonance associated with the flow of air through the grill.

16 Claims, 8 Drawing Sheets

METHOD AND DEVICE FOR ATTENUATING AERODYNAMICALLY INDUCED NOISES CAUSED BY VEHICLE GRILLE

BACKGROUND

Exemplary embodiments herein generally relate to a cooling structure for a front end of a vehicle. More particularly, the present disclosure is directed to a grille for a vehicle bumper configured to attenuate aerodynamically induced noises and sounds from the flow of air through the grille.

Figure 1:
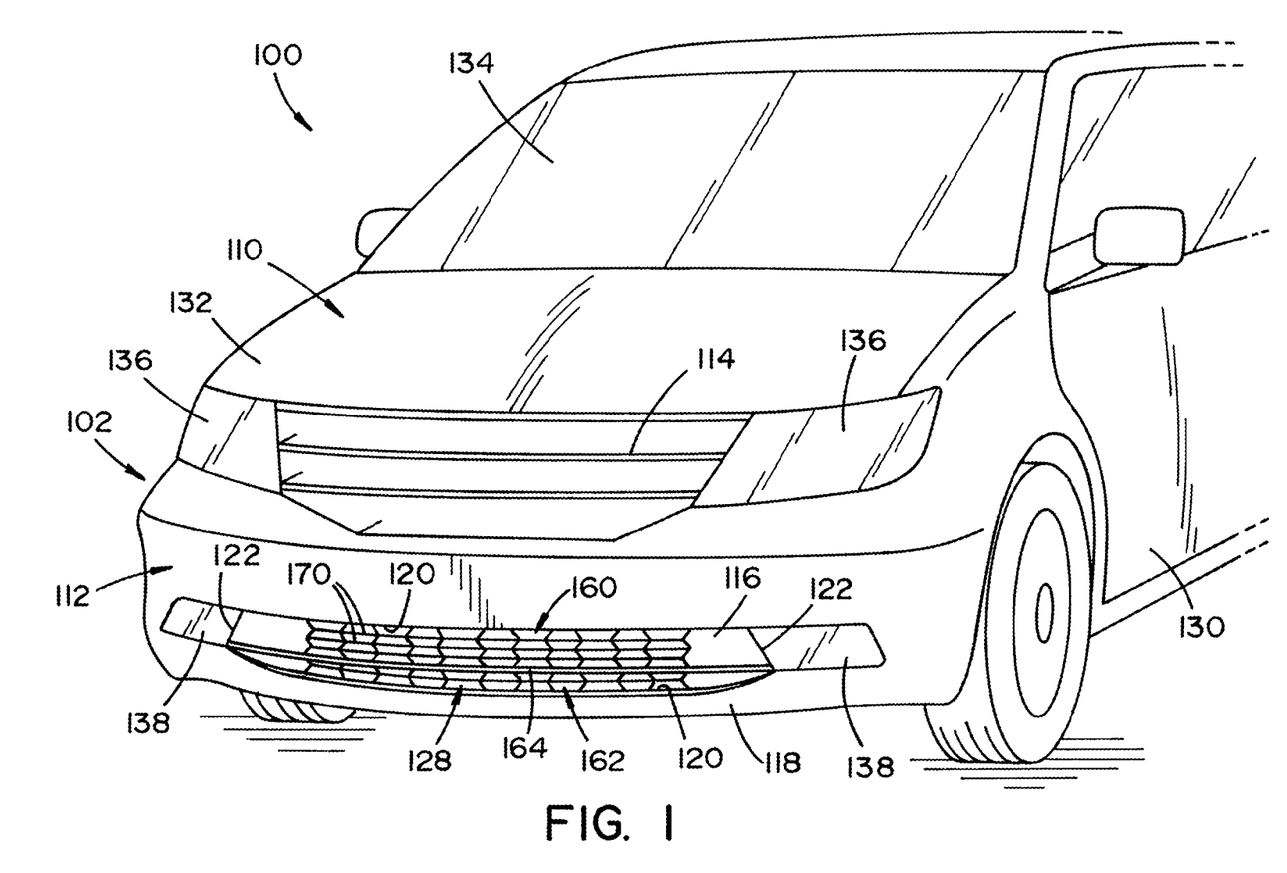
FIG. 1 is a perspective view of a vehicle having a bumper located at a front end, the bumper including a grille.
Figure 2:
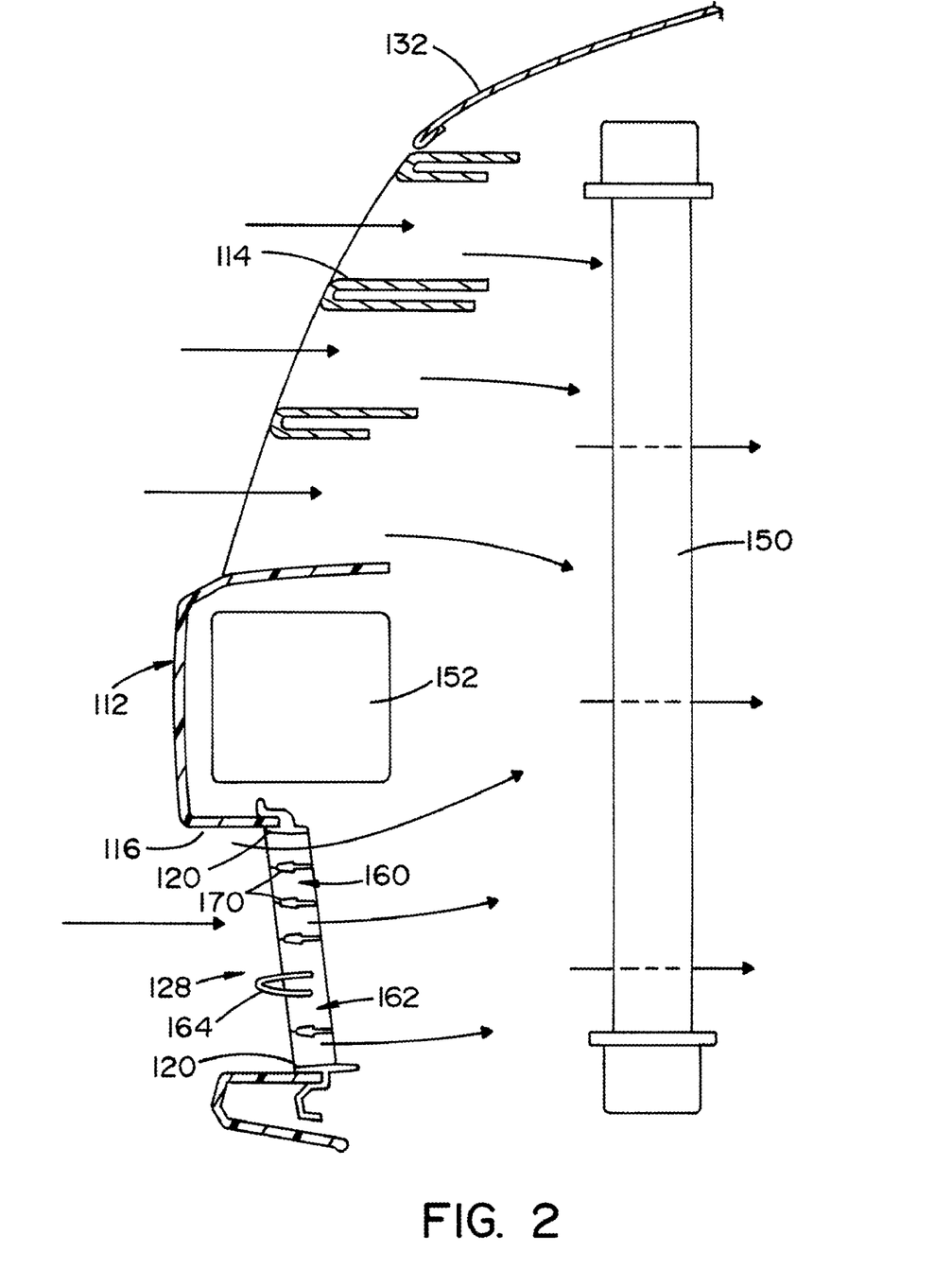
FIG. 2 is a vertical cross-sectional view of the front end of the vehicle of FIG. 1.

FIG. 1 is a perspective view of a vehicle 100 provided with a cooling structure 102. The vehicle 100 includes an engine compartment 110 provided at a front end of the body of the vehicle, a bumper 112 attached to a lower portion of the front end of the vehicle body and a grille 114 attached to an upper portion of the front end of the vehicle body. The bumper 112 has an elongated opening 116 formed in a central portion of a frontward protruding portion 118 of the front bumper 112, and the opening elongates in the transverse direction of the vehicle body. The opening 116 is defined by spaced transverse walls 120,120 and spaced apart side walls 122,122. A grille or mesh 128 is secured in the elongated opening 116. Left and right doors 130 are attached to the sides of the vehicle body. In the figure, reference numeral 132 denotes a bonnet, reference numeral 134 denotes a windshield, reference numerals 136,136 denote headlamps, and reference numerals 138,138 denote fog lights. As shown in FIG. 2, a radiator 150 is disposed rearward of the front bumper 112, i.e., below a front end portion of the bonnet 132 relative to the longitudinal direction of the vehicle body. This radiator 150 is cooled by cooling air introduced from the grille 114 and bumper grille 128. To secure the front bumper 112 to the vehicle body, a bumper beam 152 can be provided. Typically, the bumper beam 152 extends in the transverse direction of the vehicle body.

Figure 3:
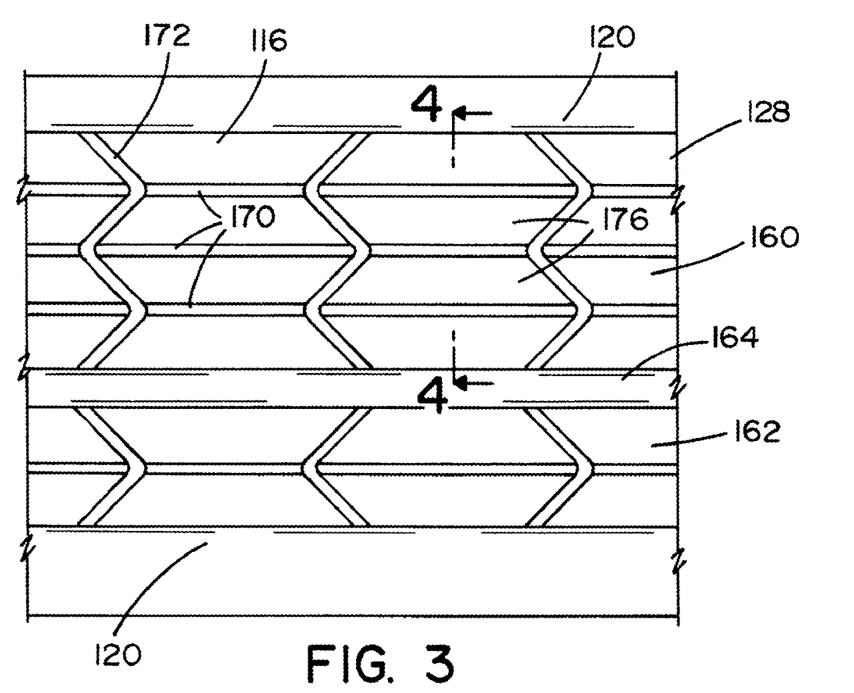
FIG. 3 is a partial enlarged view of the bumper grille of FIG. 1.
Figure 4:
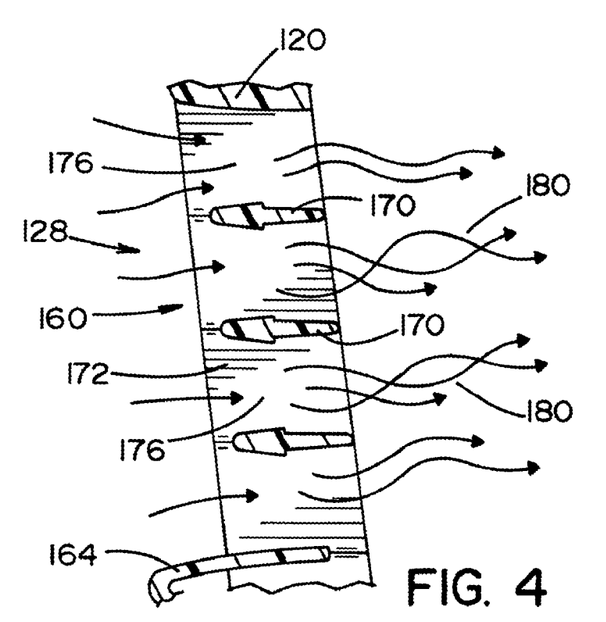
FIG. 4 is a cross-sectional view of the grille of FIG. 3 taken along line 4-4 of FIG. 3, FIG. 4 illustrating the flow of air through an upper mesh part of the bumper grille.

With particular reference to FIGS. 2-4, the bumper grille 128 includes an upper mesh part 160 and a lower mesh part 162, which is separated from the upper mesh part by a transverse member 164. The upper and lower mesh parts 160,162 direct cooling air toward a central portion of the radiator 150 and also shield the elongated opening 116 when viewed from the front of the vehicle body. The upper mesh part 160 includes a plurality of horizontal members 170 and a plurality of vertical members 172. As shown, the horizontal members 170 are in a stacked relationship to one another. The spaced apart vertical members 172 span between the upper transverse wall 120 and transverse member 164 and together with the horizontal members 170 define a plurality of stacked and transversely spaced rhombus shaped air passages 176. The lower mesh part 162 has a construction similar to the upper mesh part 160.

Figure 5:
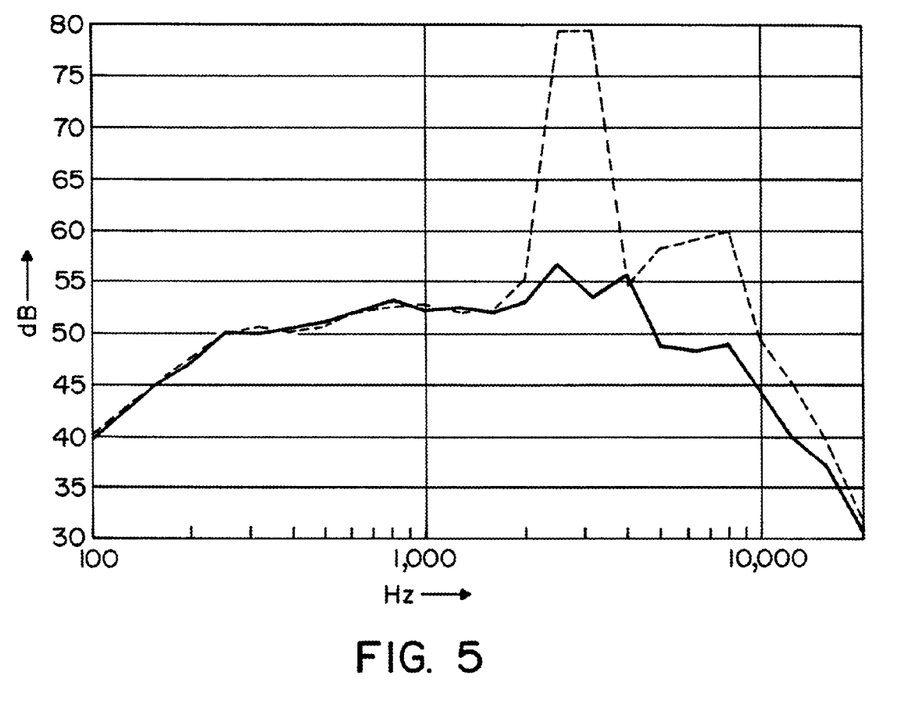
FIG. 5 graphically illustrates sound amplitude associated with the flow of air through the upper mesh part of the bumper grille of FIG. 1.

With this construction of the bumper grille 128, the upper and lower mesh parts 160,162 restrict the passage of particles to the vehicle radiator 150, thereby preventing large objects, such as rocks or road debris, from striking and damaging the vehicle radiator. However, as shown in FIG. 4, the flow of air through the upper mesh part 160 can create resonant vortices 180 downstream of the grille 128. These resonant vortices 180 can result in unwanted noises, such as a whistle sound, that is audible from the inside of the vehicle. Particularly, FIG. 5 graphically illustrates the whistle amplitude associated with the flow of air through the upper mesh part 160 of the grille 128. The solid line shows the sound amplitude of the air passing through the lower mesh part 162 of the bumper grille 128 with the upper mesh part 160 being masked. In the range of 2 kHz to 4 kHz, the sound or noise amplitude associated with the air flowing through the bumper grille 128 is about 55 dB, which is the sound amplitude of a normal conversation at 1 m. The dashed line shows the sound amplitude of the air passing through both the upper mesh part 160 and the lower mesh part 162 of the bumper grille 128. In the range of 2 kHz to 4 Khz, the sound or noise associated with the air flowing through the bumper grille 128 is about 79 dB, which is the sound amplitude of traffic on a busy roadway at 10 m. Because this whistle amplitude is audible within the vehicle cabin, it is desirable to mitigate or minimize the resonant vortices and the accompanying sounds associated with the cooling air passing through the bumper grille 128.

BRIEF DESCRIPTION

In accordance with one aspect, a bumper for a front end of a vehicle comprises a body having an opening defining an air flow inlet. The opening is elongated in the transverse direction of the body and is defined by spaced apart transverse walls and spaced apart side walls. A grille is disposed in the opening. The grille includes at least one generally horizontal member having at least one sound attenuating member attached thereto and configured to at least partially alter the air flow passing through the grille to mitigate resonance associated with the flow of air through the grill.

In accordance with another aspect, a method of attenuating resonance generated by a flow of air through a grille provided in an elongated opening of a bumper located at a front end of a vehicle is provided. The method comprises providing the grille with at least two separate air ports for the flow of air through the grille, and providing at least one sound attenuating member in each air port.

In accordance with yet another aspect, a grille for a bumper for a front end of a vehicle includes a plurality of horizontal members connected with a plurality of generally vertical members. The grille defines a plurality of air ports through which air passes through the grille. At least one sound attenuating member is connected with at least one of the horizontal members and vertical members and is configured to at least partially alter the air flow passing through the grille to mitigate resonance associated with the flow of air through the grille.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary vehicle bumper grille disclosed herein are merely terms of art that may vary from one manufacturer to another and should not be deemed to limit the present disclosure.

Referring now to the drawings, wherein like numerals refer to like parts throughout the several views, FIGS. 6-9 illustrate an exemplary grille 200 for use within the opening 116 of the bumper 112 according to one aspect of the present disclosure. The grille 200 includes at least one generally horizontal member extending in the transverse direction of the vehicle body and at least one vertical member. At least one sound attenuating member 250,300,350 is connected to one of the at least one horizontal member and the at least one vertical member to at least partially alter the air flow passing through the grille 200 to mitigate resonance associated with the flow of air through the grille 200.

Figure 6:
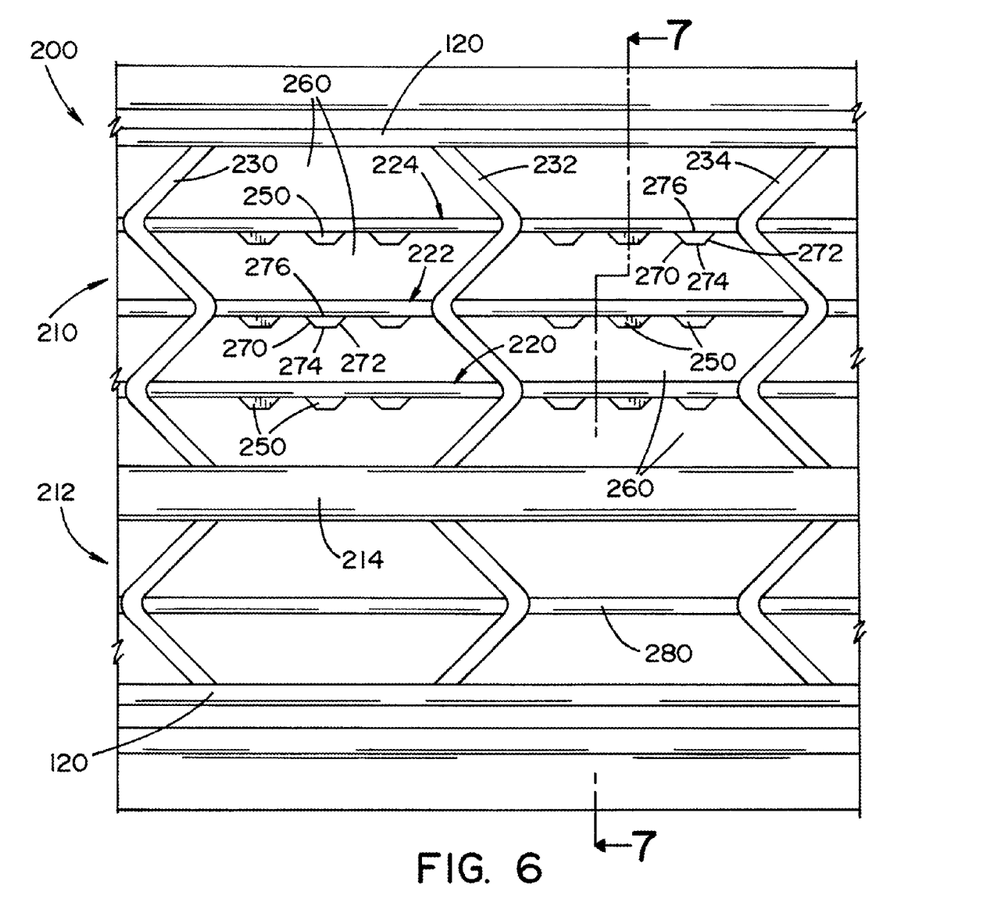
FIG. 6 is an enlarged view of an exemplary grille for the bumper of FIG. 1, an upper mesh part of the exemplary grille having a sound attenuating member according to one aspect of the present disclosure.

More particularly, the grille 200 includes an upper mesh part 210 and a lower mesh part 212, which is separated from the upper mesh part by a transverse member 214. Similar to grille 128 (FIG. 1), the upper and lower mesh parts 210,212 direct cooling air toward a central portion of the radiator 150 and also shield the elongated bumper opening 116 when viewed from the front of the vehicle body. The upper mesh part 210 includes a plurality of horizontal members 220,222, 224 and a plurality of vertical members (only vertical members 230,232,234 are shown in FIG. 6). As depicted, the horizontal members 220,222,224 are in a stacked, parallel relationship to one another. Each vertical member 230,232, 234 is upwardly inclined in an alternating manner toward one of the side walls 122,122 (FIG. 1) relative to the horizontal members. That is, each vertical member 230,232,234 is generally triangular wave shaped. The vertical members 230,232, 234 span between the upper transverse wall 120 and transverse member 214 and together with the horizontal members 220,222,224 define a plurality of stacked and transversely spaced air passages or ports 260. Each air port 260 is rhombus shaped when viewed from the front of the vehicle. Although, it should be appreciated that alternative configurations for the individual air ports 260 are contemplated. Further, with the general triangular wave shape of the vertical members, the array of air ports 260 defined by the transverse member 214 and horizontal member 220 is a mirror image of the array of air ports 260 defined by horizontal members 220 and 222, and the array of air ports 260 defined by the horizontal members 222 and 224 is a mirror image of the array of air ports 260 defined by horizontal members 224 and upper transverse wall 120. As used herein, the term "array" means that the plurality of air ports 260 are generally aligned along the transverse length of the vehicle body.

Figure 7:
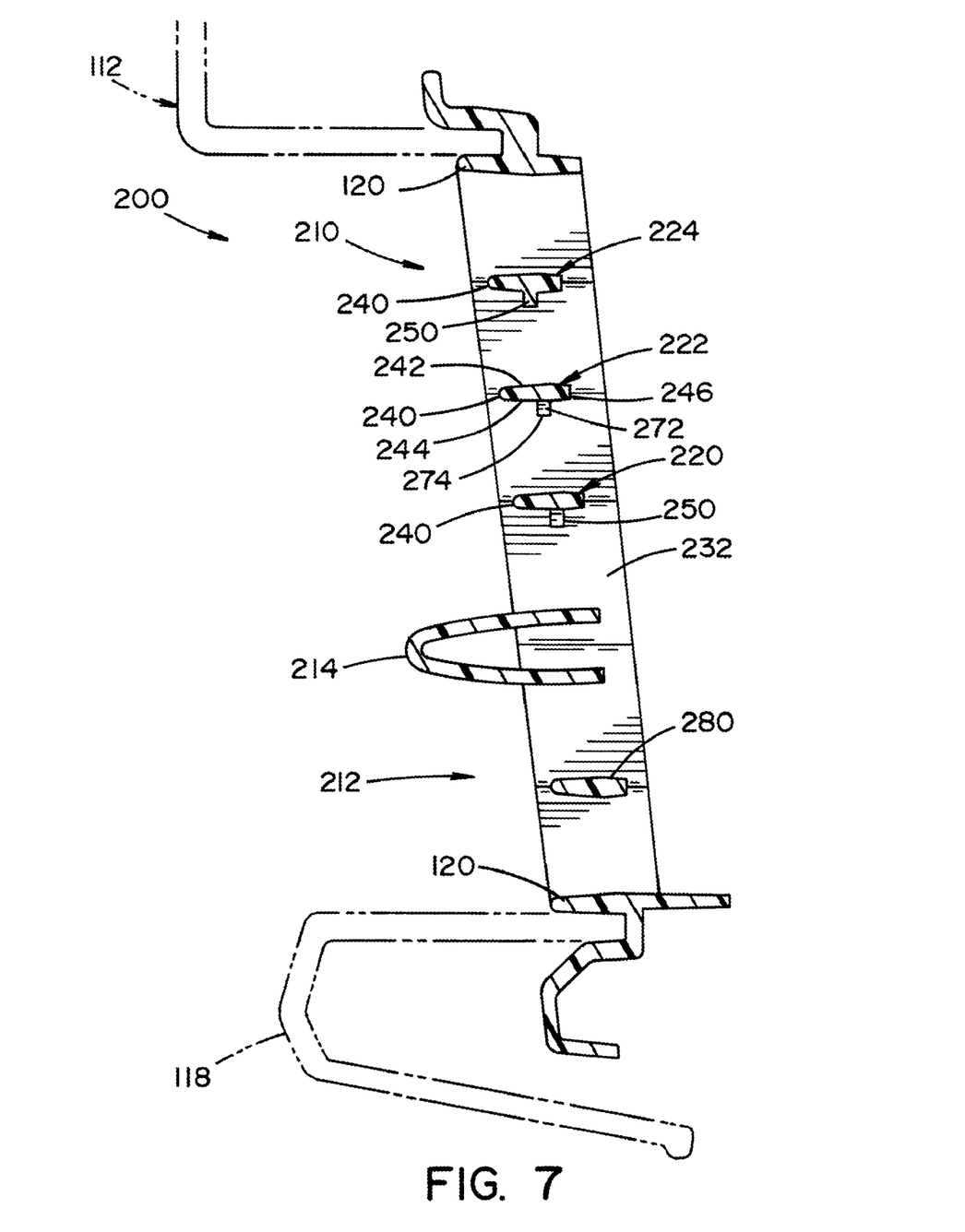
FIG. 7 is a cross-sectional view of the grille of FIG. 6 taken along line 7-7 of FIG. 6.

With reference to FIGS. 6 and 7, each horizontal member 220,222,224 includes a front wall 240, an upper or top surface 242, a lower or bottom surface 244 and a back wall 246. The upper and lower surfaces 242 and 244 are generally planar surfaces; although, this is not required. As indicated previously, the grille 200 includes the at least one sound attenuating member 250 to mitigate resonance associated with the flow of air through the grille 200. The at least one sound attenuating member 250 extends downwardly from a bottom surface 244 of at least one of the horizontals members 220, 222,224. In the depicted exemplary embodiment, the at least one of the horizontal members 220,222,224 includes a plurality of transversely spaced sound attenuating members 250. More particularly, each horizontal member includes a plurality of sound attenuating members 250 extending downwardly from their respective bottom surfaces 244. The plurality of sound attenuating members 250 located on each horizontal member 220,222,224 is arranged such that each air port 260 includes at least one sound attenuating member 250. In the illustrated embodiment, each air port 260 includes three transversely spaced sound attenuating members; though more or less than three are contemplated. With particular reference to FIG. 7, each sound attenuating member 250 is spaced rearwardly of the forward wall 240 of each horizontal member 220,222,224. In the depicted exemplary embodiment, each sound attenuating member 250 is also spaced forwardly of the rear wall 246 of each horizontal member 220,222,224. Further, as shown in FIG. 6, the sound attenuating members 250 are only provided in the air ports 260 defined by the horizontal members 220,222,224, transverse member 214 and vertical members 230,232,234. The air ports 260 defined by the upper transverse wall 120 and horizontal member 224 are devoid of any sound attenuating member. In other words, the transverse walls 120,120 that define the opening 116 provided in the bumper 112 are not provided with sound attenuating members.

Each sound attenuating members 250 are shaped similar to the shape of each air port 260, which as indicated previously is rhombus shaped when viewed from the front of the vehicle 100. As shown in FIG. 6, each sound attenuating member 250 includes a pair of side walls 270,272, a bottom surface 274 and an upper surface 276. The upper surface 276 is secured to the bottom surface 244, and the sound attenuating members 250 can be integrally formed with each horizontal member 220,222,224. The bottom surface 274 of each sound attenuating member 250 is generally planar and generally parallel to the upper surface 242 of the horizontal member located directly beneath the sound attenuating member 250.

To have a cross-sectional shape similar to the air port 260, one of the sound attenuating member sidewalls 270, 272 extends generally parallel to one of the vertical members and the other sound attenuating member sidewall extends generally parallel to the other grille vertical member. For example, for the sound attenuating members 250 located on horizontal member 222 and between vertical members 230 and 232, sidewall 270 is generally parallel to vertical member 232 and sidewall 272. The bottom surface 274 is generally parallel to the top surface 242 of the horizontal member located directly beneath the sound attenuating member. As shown, each of the sound attenuating members 250 are rhombus shaped and, more particularly, are trapezoid shaped. Similar to grille 128, the lower mesh part 212 has a construction similar to the upper mesh part 210. However, according to the present disclosure, the sound attenuating members 250 are provided only on the upper mesh part 210 so as to not be visible as viewed from above. As such, horizontal member 280 of the lower mesh part 212 is devoid of any sound attenuating members.

Figure 8:
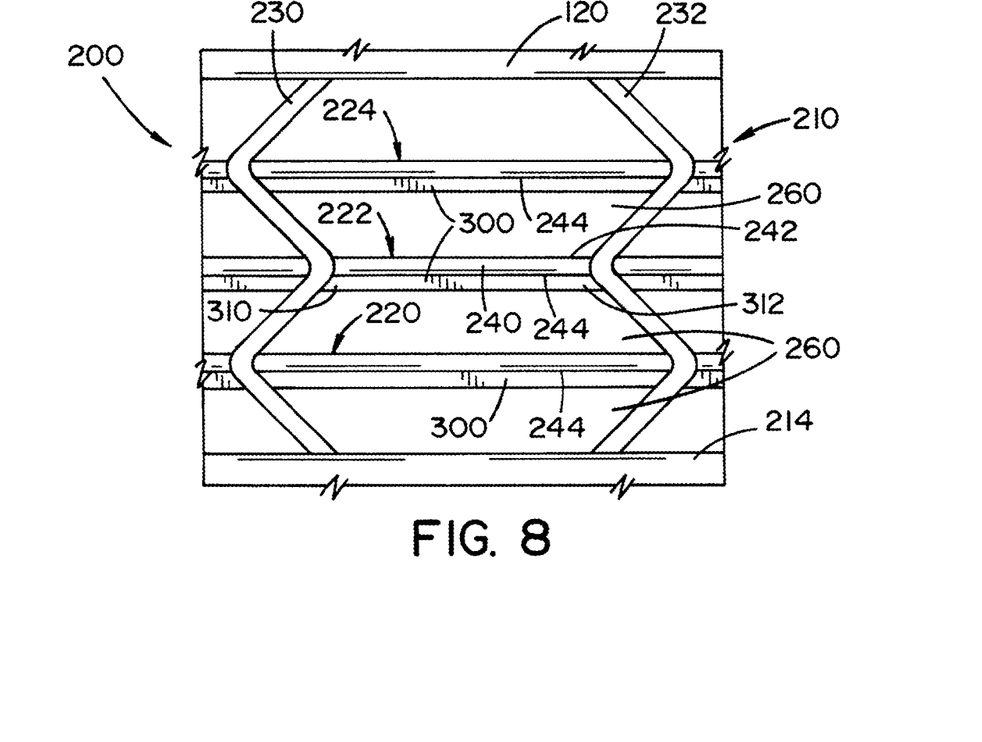
FIG. 8 is an enlarged view of the exemplary grille for the bumper of FIG. 1, an upper mesh part of the exemplary grille having a sound attenuating member according to another aspect of the present disclosure.

With reference to FIG. 8, a sound attenuating member 300 for the grille 200 according to another aspect of the present disclosure is shown. A sound attenuating member 300 is attached to the bottom surface 244 of each horizontal member 220,222,224. Similar to sound attenuating member 250, sound attenuating member 300 can be positioned rearward of the forward wall 240 and forward from the rear end of the bottom surface 244. As depicted, the exemplary sound attenuating member 300 extends substantially along the transverse length of each horizontal member 220,222,224. Although, it should be appreciated that the sound attenuating member 300 can be separated by the vertical members (only vertical members 230,232 are shown in FIG. 8) such that a plurality of transversely spaced sound attenuating members 300 are provided on each horizontal member 220,222,224. With this configuration, opposed ends 310,312 of each sound attenuating member 300 are closely adjacent to or abut one of the vertical members. Further, each sound attenuating member 300 can have sidewalls which do not extend parallel to the vertical walls. For example, the sidewalls of each sound attenuating member can be substantially perpendicular to the horizontal members 220,222,224. Similar to the previous embodiment of the bumper grille 200, the transverse members 120,120 that define the opening 116 provided in the bumper 112 are not provided with sound attenuating members 300.

Figure 9:
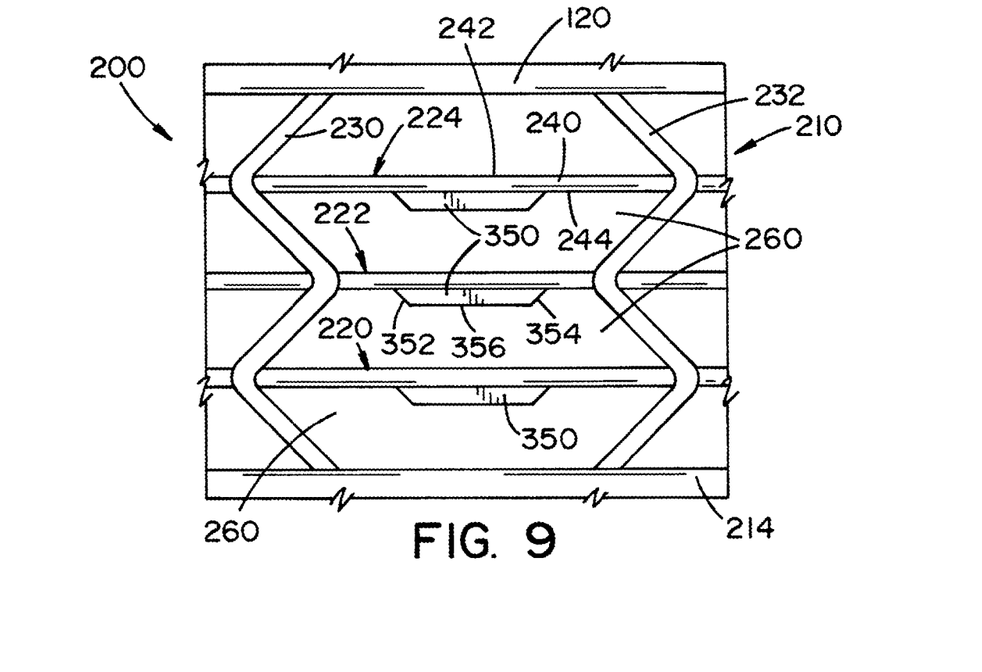
FIG. 9 is an enlarged view of an exemplary grille for the bumper of FIG. 1, an upper mesh part of the exemplary grille having a sound attenuating member according to yet another aspect of the present disclosure.

With reference to FIG. 9, a sound attenuating member 350 for the grille 200 according to yet another aspect is illustrated. Similar to the previous embodiments, at least one sound attenuating member 350 is attached to the bottom surface 244 of each horizontal member 220,222,224. The sound attenuating member 350 has a shape similar to the sound attenuating member 250. In particular, the sound attenuating member 350 includes sidewalls 352,354 and a generally planar bottom surface 356. The bottom surface 356 is generally parallel to each horizontal member 220,222,224. The sidewalls are shaped similar to the vertical members (only vertical members 230,232 are shown in FIG. 9) such that one of the sidewalls 352,354 is generally parallel to one of the vertical members and the other sidewall is generally parallel to the other vertical member. With this configuration, and as depicted in FIG. 9, each sound attenuating member 350 is trapezoid shaped. As shown, only a single sound attenuating member is provided in each of the air ports 260 defined by the horizontal members 220,222,224, transverse member 214 and vertical members 230,232. The air ports 260 defined by the upper transverse wall 120 and the horizontal member 224 are devoid of any sound attenuating member. In other words, the transverse members 120,120 that define the opening 116 provided in the bumper 112 are not provided with sound attenuating members.

Figure 10:
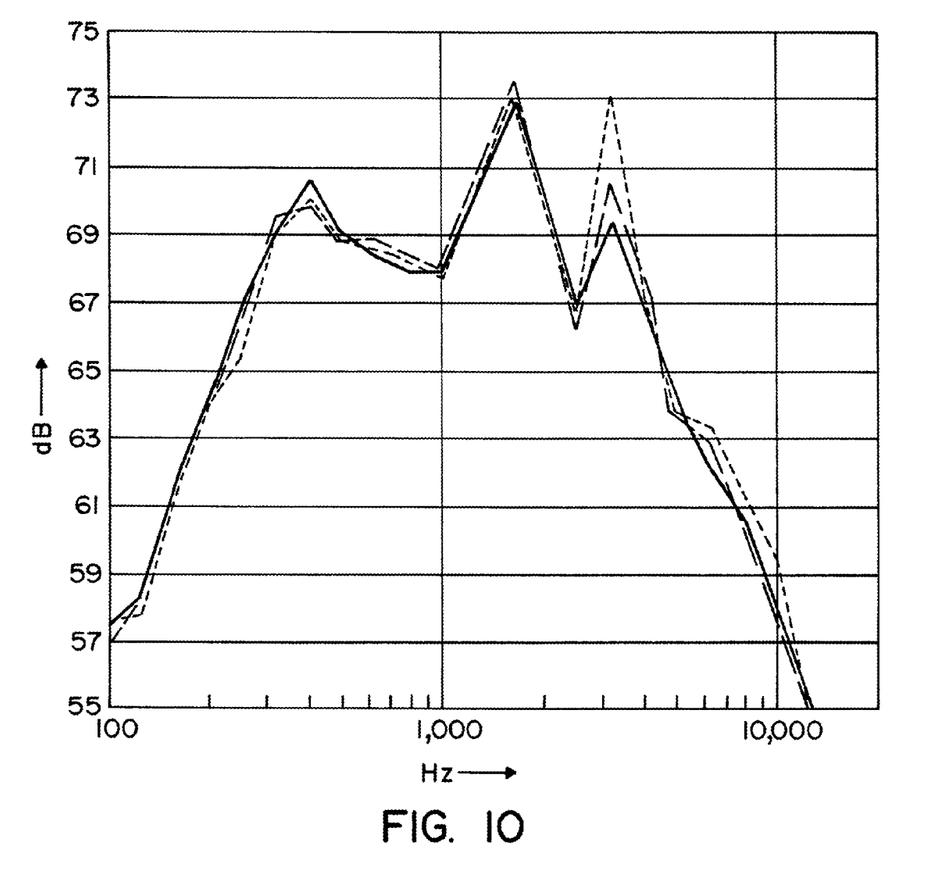
FIG. 10 graphically illustrates sound amplitude associated with the flow of air through the upper mesh part of the bumper grilles of FIGS. 6, 8 and 9.

By adding at least one sound attenuating member 250,300, 350 to the horizontal members 220,222,224 of the grille 200, the whistle noise associated with the known grille 128 can be mitigated. For example, FIG. 10 graphically illustrates the sound amplitude associated with the flow of air through the upper mesh part 210 of the bumper grille 200. The solid line shows the sound amplitude of the air passing through the air ports 260 having the sound attenuating member 250. In the range of 2 kHz to 4 kHz, the sound or noise amplitude associated with the air flowing through the bumper grille 200 is about 67 to 69 dB. The longer dashed line shows the sound amplitude of the air passing through the air ports 260 of the upper grille part 210 having the sound attenuating member 300. In the range of 2 kHz to 4 kHz, the sound or noise associated with the air flowing through that exemplary bumper grille 200 is about 67 to 70 dB. The smaller dashed line shows the sound amplitude of the air passing through the air ports 260 of the upper mesh part 210 having the air attenuating member 350. In the range of 2 kHz to 4 kHz, the sound or noise associated with the air flowing through that embodiment of the exemplary grille 200 is about 67 to 73 dB. Thus, with the sound attenuating member being connected to at least one of the horizontal members and the vertical members, the air passing through the grille 200 is at least partially altered which in turn mitigates resonance associated with the flow of air through the grille 200.

A method of attenuating resonance generated by a flow of air through the grille 200 is also provided. The method includes providing the grille 200 with at least two separate air ports 260 for the flow of air through the grille 200, and providing at least one sound attenuating member 250,300, 350 in each air port 260. The method further includes providing three spaced apart sound attenuating members 250 in each air port 260, each sound attenuating member having a shape similar to a transverse cross-sectional shape of the air port 260. The method further includes attaching each sound attenuating member 250,300,350 to a bottom surface 244 of each horizontal member 220,222,224, which at least partially defines each air port 260, and locating each sound attenuating member 250,300,350 rearward of an air inlet of each air port 260.

A first array or plurality of transversely spaced air ports 260 and a second array or plurality of transversely spaced air ports 260 located above the first array of air ports are provided. The method includes locating at least one sound attenuating member 250,300,350 in each air port of the first array of air ports 260 and aligned that at least one sound attenuating member with the at least one sound attenuating member 250,300,350 located in the air port 260 of the second array of air ports directly above the air port of the first array. For example, with reference to FIG. 6, the sound attenuating members 250 disposed on horizontal member 222 between vertical members 230 and 232 are both vertically and horizontally aligned with the sound attenuating members 250 disposed on horizontal member 224 between vertical members 230 and 232.

As is evident from the foregoing, the present disclosure seeks to eliminate the whistle sounds by including sound attenuating members only on the upper mesh part 210 of the grille 200. By including these sound attenuating members, any flow interactions within the vehicle grille 200 that would produce resonant vortices are reduced. Thus, the whistle sounds which would be audible in the passenger compartment of the vehicle 100 are substantially eliminated, thereby improving occupant comfort.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A bumper for a front end of a vehicle comprising:
a body having an opening defining an air flow inlet, the opening being elongated in the transverse direction of the body, the opening defined by spaced apart transverse walls and spaced apart side walls; and
a grille disposed in the opening, the grille including at least one generally horizontal member having at least one sound attenuating member attached thereto,
wherein the grille includes at least two spaced apart, immediately adjacent vertical members which are inclined relative to the horizontal members, and the at least one sound attenuating member is positioned entirely between the spaced immediately adjacent vertical members, the at least one sound attenuating member has spaced apart sidewalls, one of the sound attenuating member sidewalls extending parallel to one of the vertical members and the other sound attenuating member sidewall extending parallel to the other vertical member.

2. The bumper of claim 1, wherein the at least one horizontal member includes a forward wall, a top surface and a bottom surface and the at least one sound attenuating member extends downwardly from the bottom surface.

3. The bumper of claim 2, wherein the at least one sound attenuating member is spaced rearwardly of the forward wall of the at least one horizontal member.

4. The bumper of claim 1, wherein the at least one sound attenuating member is trapezoid shaped.

5. The bumper of claim 1, wherein the at least one horizontal member includes a plurality of transversely spaced apart sound attenuating members.

6. The bumper of claim 1, wherein the grille further includes a plurality of spaced apart horizontal members and a plurality of vertical members, the plurality of vertical members together with the plurality of horizontal members at least partially defining separate air ports for the flow of air through the grille, each air port including at least one sound attenuating member.

7. The bumper of claim 6, wherein each horizontal member includes a plurality of transversely spaced sound attenuating members.

8. The bumper of claim 7, wherein each air port includes at least two sound transversely spaced attenuating members.

9. The bumper of claim 1, wherein the grille includes an upper mesh and separate lower mesh, the at least one sound attenuating member being provided only on the upper mesh.

10. A grille for a bumper for a front end of a vehicle comprising:
a plurality of generally horizontal members connected with a plurality of generally vertical members, the plurality of horizontal members and vertical members defining a plurality of air ports through which air passes through the grille, and at least one sound attenuating member provided between immediately adjacent vertical members and entirely in an air port, the at least one sound attenuating member connected with one of the horizontal members and spaced from the other horizontal member and the immediately adjacent vertical members that define the air port.

11. The grille of claim 10, wherein the at least one sound attenuating member is positioned rearward of an air inlet of the air port.

12. The grille of claim 11, wherein the at least one sound attenuating member depends from a planar bottom surface of the one horizontal member.

13. The grille of claim 12, wherein the at least one sound attenuating member is positioned forward from a rear end of the bottom surface.

14. The grille of claim 13, wherein at least one of the horizontal members is devoid of sound attenuating members.

15. The grille of claim 10, wherein at least two immediately adjacent vertical members are inclined relative to the horizontal members to define an air port having a trapezoidal transverse cross-sectional shape, and the at least one sound attenuating member is positioned between the inclined vertical members.

16. The grille of claim 15, wherein the at least one sound attenuating member has spaced apart sidewalls, one of the sound attenuating member sidewalls extending parallel to one of the inclined vertical members and the other sound attenuating member sidewall extending parallel to the other inclined vertical member.

* * * * *